UNITED STATES PATENT OFFICE 2,475,347

POLYMERS FROM NITROPOLYHYDROXY ALCOHOLS AND POLYAMINES

Paul Arthur, Jr., and Maynard Stanley Raasch, Wilmington, Del., assignors to E. I. du Pont de Nemours & Company, Wilmington, Del., a corporation of Delaware No Drawing. Application September 9, 1944, Serial No. 553,454

10 Claims. (Cl. 260—2)

This invention relates to synthetic resins and more particularly to synthetic resins containing both amino groups and nitro groups.

This invention has as an object the preparation of a synthetic resin having basic properties. A further object is the preparation of basic polymers containing both amino groups and nitro groups in the same molecule. Further objects will appear hereinafter.

These objects are accomplished by the following invention wherein an alpha-polymethylol nitroparaffin is reacted with a polyamine having a plurality of amino groups in which at least one hydrogen is attached to amino nitrogen and the remaining valences of the amino nitrogens are attached only to aliphatic carbon.

By "alpha-polymethylol nitroparaffin" is meant a compound having at least two —CH₂OH groups attached to an aliphatic carbon carrying a nitro group, any remaining valence of this carbon being satisfied by hydrogen or an aliphatic hydrocarbon radical. Alpha-polymethylol nitroparaffins can be readily prepared by the reaction of formaldehyde with a nitroparaffin in accordance with the equation

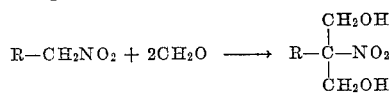

where R is hydrogen or alkyl. In the case of nitromethane it is possible to link three methylol groups to the alpha-carbon by reaction with formaldehyde.

In a preferred process of the invention a diprimary or disecondary diamine, in which the aminonitrogens are linked only to hydrogen and to aliphatic carbon, is mixed at room temperature in aqueous solution with an alpha-polymethylol nitroparaffin, preferably, a 2-nitro-1,3-propanediol. The reaction begins a short time after mixing and the insoluble polymer which forms during the course of the reaction is separated by filtration, washed with water and dried. In a second preferred process, the reactants are mixed in alcoholic solution and the polymer is precipitated with water a short time after mixing. The ease of preparation of these basic polymers represents an important advantage of this invention.

The following examples in which parts are by weight are illustrative of the invention.

Example I

Nineteen and forty-two hundredths parts of piperazine hexahydrate and 13.51 parts of 2-nitro-2-methyl-1,3-propanediol, each in 20% aqueous solution, are mixed at 25° C. After ten minutes the reaction product separates out and after standing for two days is filtered off and washed with water. The yield of dry product is 17 parts. The white, powdery product softens at about 295° C., is soluble in dilute acids and phenol and insoluble in pyridine, cyclohexanone, ethanol, and tetrachloroethylene.

Example II

Eleven and sixty-two hundredths parts of hexamethylenediamine and 13.51 parts of 2-nitro-2-methyl-1,3-propanediol are mixed at 25° C. as 20% solutions in methanol. After standing for two hours, the mixture is diluted with two volumes of water. The product soon begins to separate as a spongy mass and after standing for two days is filtered off and washed with water. The yield of dry product is 15.8 parts. The polymer softens at about 145° C. and is soluble in dilute acetic or hydrochloric acid and nearly completely soluble in butyl acetate. A film cast from butyl acetate is clear and elastic. This film is hardened and toughened by soaking in a dilute solution of hexamethylene diisocyanate in xylene. The original film is improved in tensile strength by soaking in a 10% aqueous solution of 2-nitro-2-methyl-1,3-propanediol for sixteen hours and then baking at 70° C. for four hours.

Example III

Sixteen and forty-two hundredths parts of N,N'-dimethyl-p-xylylenediamine and 13.51 parts of 2-nitro-2-methyl-1,3-propanediol, each in 20% aqueous solution, are mixed at 25° C. A soft product slowly separates and develops into a hard, brittle solid after standing for several days in the mother liquor. The yield is 9.4 parts. The product softens at about 100° C. and is soluble in dilute acids and xylene. It is purified by dissolving in xylene and precipitating with methanol, which causes the polymer to separate as a white powder.

The polyamines useful in this invention are those having a plurality of amino groups having at least one hydrogen attached to amino nitrogen, the remaining valences of the nitrogen being satisfied by aliphatic carbon, preferably hydrogen-bearing aliphatic carbon. Included among the polyamines of the above type are the polymethylene diprimary diamines, e. g., ethylenediamine, propylenediamine, octamethylenediamine, decamethylenediamine, dodecamethylenediamine; the polymethylene disecondary diamines, e. g. N,N'-dimethylhexamethylenediamine, N,N' - dimethyldodecamethylenediamine; the mixed primary and secondary polymethylenediamines, for example, N-methylhexamethylenediamine; disecondary diamines in which the amino groups are part of a ring as in piperazine as illustrated by Example I; diprimary and disecondary diamines in which the amino groups are connected by a chain containing cyclic groups, for example, the N,N'-dimethyl-para-xylenediamine of Example III. In addition, the polyethylenediamines, for example diethylenetriamine and triethylenetetramine are also useful in forming the polymeric products of this invention. Diamines are preferred for preparing polymers which are soluble in organic solvents.

The alpha-polymethylolnitroparaffins are nitroalcohols which have one or more groupings in which a nitro group is attached to a carbon to which in turn is attached at least two methylol groups. Included are dimethylolnitromethane and trimethylolnitromethane. Also included are the nitroparaffins which have more than one nitro group and which have at least two methylol groups on carbons joined to the nitro groups. The preferred group of nitroalcohols falls under the general class of 2-nitro-1,3-propanediols and includes 2-nitro-2-methyl-1,3-propanediol as in the examples, 2-nitro-2-ethyl-1,3-propanediol, and in general 1,3-propanediols of the formula

where R is alkyl of from one to ten or more carbon atoms.

Although the reaction of the polyamine with the alpha-polymethylol nitroparaffin takes place at a satisfactory rate at room temperatures, higher or lower temperatures may be used, for example, the reaction proceeds satisfactorily within the limits of 0-100° C. The higher temperature is only limited by the decomposition temperature of the nitroalcohol or the polymeric product derived therefrom, whereas the lower temperature is that below which no satisfactory rate of reaction is obtained.

In the preparation of polymers from diamines, it is preferred to react the diamine with an approximately equimolar quantity of the nitroalcohol, particularly if it is an alpha-dimethylol nitroparaffin. If the amine contains more than two amino groups, an amine-nitroalcohol ratio for the reactants of less than one is preferred.

The reaction may be carried out in a suitable solvent, for example, water or an alcohol and polymers that do not separate from the solvent used may be precipitated by a non-solvent. When the reaction is carried out in alcohol, the polymer is conveniently precipitated with water if it does not separate from the alcohol. The polymer precipitated by water is not necessarily again soluble in alcohol.

The products of this invention are all resinous, high-molecular-weight, i. e., macromolecular, polymers of basic character which are insoluble in water but soluble in dilute aqueous acids. The properties of the polymers vary widely with the polyamine used in their preparation, as revealed in the examples. The polymers range from hard, somewhat brittle, resinous-appearing solids to soft, elastic materials. Softening points range from 295° C. to 40° C. or less. In general, they dissolve in one or more of the following classes of organic solvents: esters, alcohols, phenols and aromatic hydrocarbons. It is surprising that soluble polymers can be obtained from primary diamines, as it might be expected that these would yield complex, crosslinked, insoluble products because of the presence of four active hydrogen atoms in the diamine molecule.

The properties of the polymers obtained from primary amines may be modified or improved by reaction with a cross-linking agent. Soaking the polymer in a dilute solution of hexamethylene diisocyanate hardens and toughens the polymer and reduces elasticity if the original material was elastic. Alpha-polymethylol nitroparaffins, themselves, may be used as modifying agents by soaking a film of the polymer in a solution of the nitroalcohol. This treatment improves the tensile strength of the film.

The polymers of this invention are useful as adhesives, cellophane binding agents, insecticides, and ion exchange resins. They may be incorporated into cellulose acetate dry spinning solutions to improve dye receptivity of the yarn. Their salts are useful as detergents, emulsifying agents, stabilizers for dispersing, and bactericides. Reduction of the nitro groups in the polymers offers a means of modifying the polymers and increasing their basicity.

While certain derivatives of the alpha-polymethylol nitroparaffins, for example, the sulfite esters, e. g., 2-nitro-2-methylpropanediol sulfite, can be reacted with the polyamines, e. g., piperazine to form polymers, it is preferred to use the nitroalcohols themselves since no added step of forming the ester prior to reaction is needed.

As many apparently widely different embodiments of this invention may be made without departing from the spirit and scope thereof, it is to be understood that the invention is not limited to the specific embodiments thereof, except as defined in the appended claims.

What is claimed is:

1. Process for preparing polymeric materials which comprises reacting, as the sole reactants, a saturated organic compound having, as its only reacting groups, a plurality of hydrogen-containing amino groups attached to aliphatic carbon with a member of the class consisting of saturated organic compounds having, as their only reacting groups, a plurality of methylol groups attached to a carbon bearing a nitro group and sulfite esters of said polymethylol compounds.

2. Process for preparing polymeric materials which comprises reacting, as the sole reactants, a saturated organic compound having, as its only reacting groups, a plurality of hydrogen-containing amino groups attached to aliphatic carbon with a saturated organic compound having, as its only reacting groups, a plurality of methylol groups attached to a carbon also attached to a nitro group.

3. Process for preparing polymeric materials which comprises reacting, as the sole reactants, an alpha-polymethylol nitroparaffin having the methylol groups as its only reacting groups with a saturated polyamine in which the only reacting groups are a plurality of amino groups having each at least one hydrogen attached to the amino nitrogen and the remaining valences of the amino nitrogens attached to aliphatic carbon.

4. Process for preparing polymeric materials wherein a saturated alpha-dimethylol nitroparaffin having the methylol groups as its only reacting groups is reacted solely with an equimolecular amount of a saturated aliphatic amine having, as its only reacting group, two hydrogen-containing amino groups.

5. Process for preparing polymeric materials which comprises reacting, as the sole reactants, 2-nitro-2-methyl-1,3-propanediol with an equimolecular amount of a saturated aliphatic amine having, as its only reacting group, two hydrogen-containing amino groups.

6. Process for preparing polymeric materials which comprises reacting, as the sole reactants, 2-nitro-2-methyl-1,3-propanediol with an equimolecular amount of a saturated aliphatic diprimary diamine wherein the amino groups are the only reacting groups.

7. Process which comprises reacting, as the sole reactants, 2-nitro-2-methyl-1,3-propanediol with an equimolecular amount of hexamethylenediamine and isolating the resultant polymer.

8. A resinous condensation product of reaction components consisting of an alphapolymethylol nitroparaffin having methylol groups as its only reacting groups and a saturated amine having, as its only reacting group, a plurality of hydrogen-bearing amino groups, any remaining valences of the amino nitrogens being satisfied by aliphatic carbon.

9. Process of claim 1 wherein the condensation product is further treated with hexamethylene diisocyanate.

10. Process of preparing resinous materials which comprises reacting, as the sole reactants, a saturated diamine containing only carbon, hydrogen, and two hydrogen-bearing amino nitrogens and an equimolecular amount of a saturated dimethylol nitroparaffin having two methylol groups and a nitro group attached to carbon of a hydrocarbon radical.

PAUL ARTHUR, JR.
MAYNARD STANLEY RAASCH.

REFERENCES CITED

The following references are of record in the file of this patent:

UNITED STATES PATENTS

| Number | Name | Date |
|---|---|---|
| 2,239,441 | D'Alelio | Apr. 22, 1941 |
| 2,284,896 | Hanford et al. | June 2, 1942 |
| 2,334,545 | D'Alelio | Nov. 16, 1943 |
| 2,419,043 | Urbanski | Apr. 15, 1947 |

FOREIGN PATENTS

| Number | Country | Date |
|---|---|---|
| 550,925 | Great Britain | Feb. 1, 1943 |

Certificate of Correction

Patent No. 2,475,347. July 5, 1949.

PAUL ARTHUR, Jr., ET AL.

It is hereby certified that errors appear in the printed specification of the above numbered patent requiring correction as follows:

Column 5, line 1, claim 4, line 7, claim 5, line 23, claim 8, for the word "group" read *groups*; same column, line 21, claim 8, after "having" insert *the*;

and that the said Letters Patent should be read with these corrections therein that the same may conform to the record of the case in the Patent Office.

Signed and sealed this 6th day of December, A. D. 1949.

[SEAL]

THOMAS F. MURPHY,
*Assistant Commissioner of Patents.*